United States Patent
Ballagas et al.

(10) Patent No.: US 11,099,658 B2
(45) Date of Patent: Aug. 24, 2021

(54) DETERMINING ORIENTATION OF A TRACKBALL

(71) Applicant: HEWLETT-PACKARD DEVELOPMENT COMPANY, L.P., Houston, TX (US)

(72) Inventors: Rafael Ballagas, Palo Alto, CA (US); Kevin Smathers, Palo Alto, CA (US); Hiroshi Horii, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 583 days.

(21) Appl. No.: 16/077,664

(22) PCT Filed: Apr. 21, 2017

(86) PCT No.: PCT/US2017/028751
§ 371 (c)(1),
(2) Date: Aug. 13, 2018

(87) PCT Pub. No.: WO2018/194638
PCT Pub. Date: Oct. 25, 2018

(65) Prior Publication Data
US 2021/0200332 A1    Jul. 1, 2021

(51) Int. Cl.
*G06F 3/03*    (2006.01)
*G06F 3/0481*  (2013.01)
*G06F 3/0354*  (2013.01)

(52) U.S. Cl.
CPC ........ *G06F 3/0312* (2013.01); *G06F 3/03549* (2013.01); *G06F 3/04815* (2013.01)

(58) Field of Classification Search
CPC . G06F 3/0312; G06F 3/03549; G06F 3/04815
See application file for complete search history.

(56) References Cited

U.S. PATENT DOCUMENTS

| | | | |
|---|---|---|---|
| 4,933,670 A | 6/1990 | Wislocki | |
| 4,952,919 A | 8/1990 | Nippoldt | |
| 5,280,276 A | 1/1994 | Kwok | |
| 5,298,919 A | 3/1994 | Chang | |

(Continued)

FOREIGN PATENT DOCUMENTS

| | | |
|---|---|---|
| EP | 2960889 A1 | 12/2015 |
| JP | 2001344068 A | 12/2001 |
| WO | WO-2012022764 A1 | 2/2012 |

OTHER PUBLICATIONS

Creating a 3D Model Viewer—Tutorial, May 28, 2009, http://www.ambiera.com/coppercube/doc/cnt_3d_model_viewer.html >.

(Continued)

*Primary Examiner* — Charles V Hicks
(74) *Attorney, Agent, or Firm* — Dicke Billig & Czaja PLLC

(57) ABSTRACT

A model controller includes a trackball having a spherical surface with one of latitudinal or longitudinal data tracks formed thereon. The model controller includes a base unit including a first image sensor adjacent to the trackball to capture images of the data tracks, wherein the captured images of the data tracks include orientation information to determine an absolute orientation of the trackball.

15 Claims, 13 Drawing Sheets

(56) References Cited

U.S. PATENT DOCUMENTS

| | | | |
|---|---|---|---|
| 7,295,947 | B2 | 11/2007 | Kurth et al. |
| 8,068,136 | B2 | 11/2011 | Protola et al. |
| 8,325,138 | B2 | 12/2012 | Touma et al. |
| 8,781,151 | B2 | 7/2014 | Marks et al. |
| 9,536,163 | B2 | 1/2017 | Veeser et al. |
| 2002/0054011 | A1 | 5/2002 | Bruneau |
| 2003/0080942 | A1 | 5/2003 | Danzyger |
| 2003/0169235 | A1 | 9/2003 | Gron et al. |
| 2005/0088412 | A1 | 4/2005 | Walton |
| 2005/0179652 | A1 | 8/2005 | Ludwig |
| 2006/0033717 | A1 | 2/2006 | Beach |
| 2007/0206030 | A1 | 9/2007 | Lukis |
| 2008/0010616 | A1 | 1/2008 | Algreatly |
| 2011/0221677 | A1* | 9/2011 | Cavacuiti ............ G06F 3/03549 345/167 |
| 2012/0139744 | A1 | 6/2012 | Ridgway |
| 2012/0306438 | A1 | 12/2012 | Howard et al. |
| 2013/0279749 | A1 | 10/2013 | Kaiser-Pendergrast |
| 2014/0002362 | A1 | 1/2014 | Srivastava |
| 2016/0062475 | A1 | 3/2016 | Gombert |

OTHER PUBLICATIONS

Miller, "Axsotic 3D mouse takes a spherical stab at an age-old problem", Nov. 9, 2010 [retrieved on Apr. 210, 2017] Retrieved from <https://www.engadget.com/2010/11/09/axsotic-3d-mouse-takes-a-spherical-stab-at-an-age-old-problem/>.

McLlroy et al., "Kinectrack: Agile 6-DoF Tracking Using a Projected Dot Pattern", Retrieved from internet—https://ieeexplore.ieee.org/document/6402533, 2012, 7 Pages.

* cited by examiner

DETERMINING ORIENTATION OF A TRACKBALL

BACKGROUND

Input devices such as a controller, a mouse, a touchpad, a pointing stick, a touchscreen, a joy stick, and a trackball, among others, may be used to control the movement of on-screen position identifiers such as pointers. Further, input devices may be used to move objects on the screen, or perform other selection and positional processes with regard to objects displayed on a display device. For example, a controller may be used to manipulate the position, location, and perspective of a two-dimensional (2D) or three-dimensional (3D) object in a computer-aided design (CAD) program in up to six degrees of freedom.

DETAILED DESCRIPTION

Figure 1:
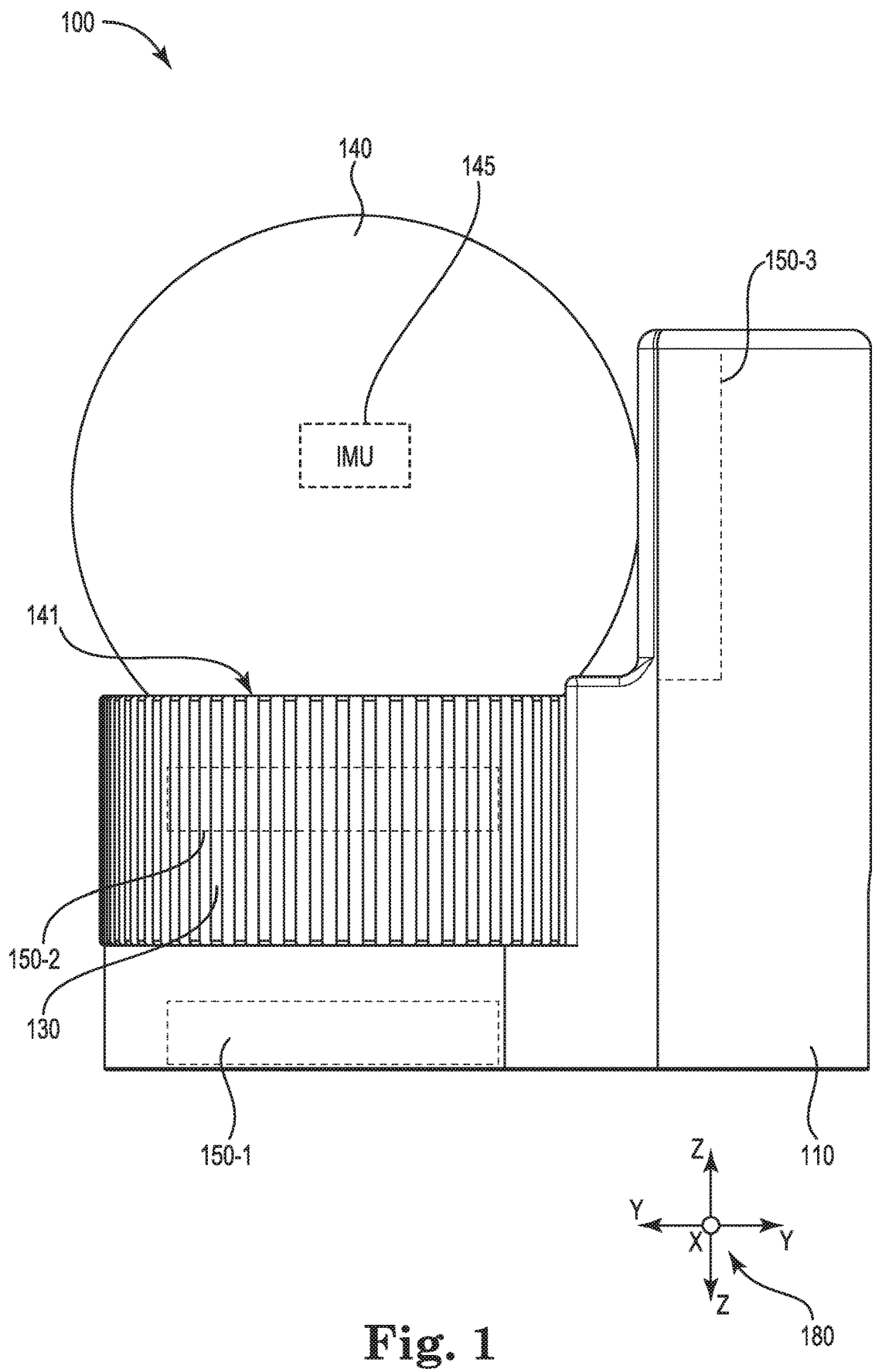
FIG. 1 is diagram illustrating a side view of a model controller according to one example.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

A controller may be any device that allows for the selection or manipulation of an object rendered on a display device in up to six degrees of freedom. In some examples, however, a user may find it inconvenient or difficult to use a first controller that provides for selection and movement of an object on a screen in a limited manner, and also use a second controller to select or move the object in a manner not provided by the first controller. Further, the user may find it difficult to also utilize other input devices such as a keyboard, a touchpad, a pointing stick, a touchscreen, or similar device to make modifications to the object using two separate controllers.

Still further, in some examples, a user may also be utilizing a virtual reality system during their use of a controller in order to manipulate and modify objects in the virtual reality, 3D space. In this example, the user may wear a virtual reality headset, and may be unable to see beyond the headset to also see, for example, a keyboard, a second controller, a touchpad, a pointing stick, a touchscreen, or other input devices. The user may be unable, or may find it extremely difficult to orient himself or herself in order to use two or more different controllers to orient the object in the display of the virtual reality system as well as make modifications to the object using the keyboard, the touchpad, the pointing stick, the touchscreen, or other input device.

Further, when using 3D CAD programs for the first time, a user may be taught to use the keyboard and another control device such as a mouse to control a 3D model. For example, a mouse button click may be used to rotate the 3D model and a wheel may be used to zoom the 3D model in and out. In another example, a simultaneous selection of a command (cmd) button and a mouse click may be used to pan the 3D model by dragging the mouse in the panning direction. In still another example, a simultaneous selection of a shift button and the mouse click may be used to zoom the 3D model in and out. Thus, in many instances, a user may find it difficult or inconvenient to handle two separate devices in moving and manipulating a 3D model or other object displayed on a display device.

Some examples disclosed herein are directed to a sphere 3D model controller for controlling and manipulating a displayed 3D model. The model controller includes a sphere positioned on a base unit. Latitudinal or longitudinal data tracks are provided on the surface of the sphere. The data tracks include bit patterns that encode orientation information, including encoded meridian IDs to determine elevation and encoded sequential IDs to determine azimuth. The base unit includes at least one image sensor to capture images of the data tracks. Absolute orientation of the sphere is determined based on the captured images. Some examples include an inertial measurement unit (IMU) included within the sphere to facilitate determination of the absolute orientation of the sphere. The IMU may include an accelerometer and magnetometer and may sense absolute 3D orientation while the sphere is lifted up off the base unit.

In some examples, the sphere serves as a physical proxy to manipulate the model with a one-to-one mapping of sphere orientation to model orientation. For example, to rotate the model 90 degrees in a specific direction, a user would rotate the sphere 90 degrees in the same direction. The model controller is useful for the following workflows: (1) 3D content creation with CAD software; (2) 3D content manipulation in Commercial VR (e.g., VR while sitting at a desk); and (3) 3D content manipulation and review directly prior to 3D printing at the 3D printer.

Unlike some devices that are based on relative motion, some examples disclosed herein do not use calibration or tuning to achieve a natural feel, and are not vulnerable to the drift that can occur with relative motion detection as each sensor reading is independent from previous readings. Some examples may use fewer sensors than devices that are based on relative motion, which results in a corresponding reduction in cost.

Figure 2:
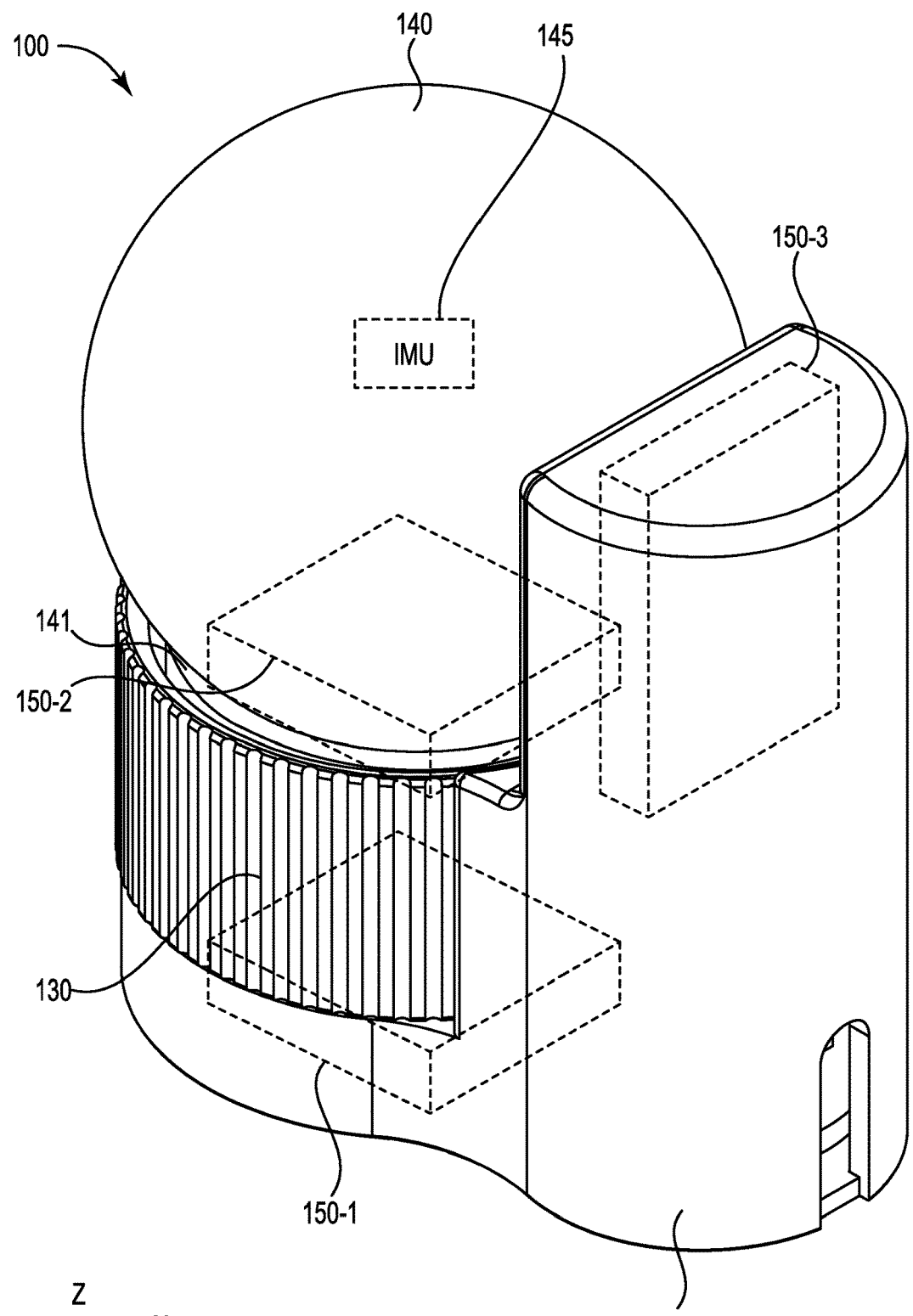
FIG. 2 is a diagram illustrating a perspective view of the model controller shown in FIG. 1 according to one example.
Figure 2:
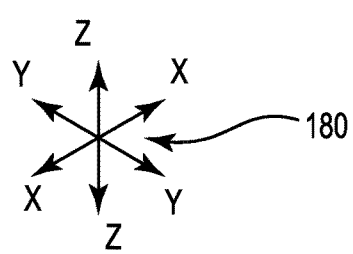
Figure 3:
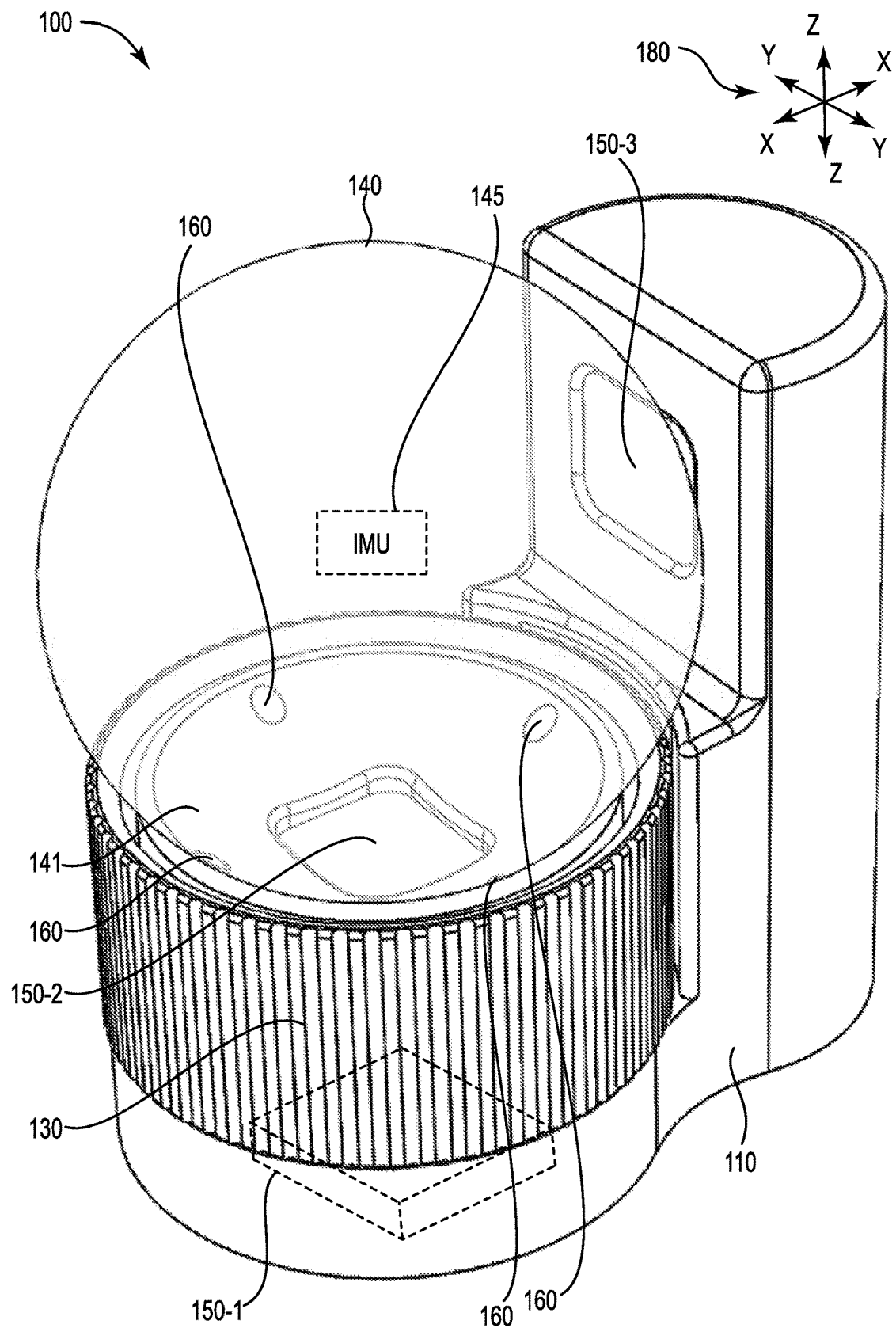
FIG. 3 is a diagram illustrating a perspective view of the model controller shown in FIG. 1 depicting a trackball in ghost and a number of sensors, according to one example.

FIG. 1 is a diagram illustrating a side view of a model controller 100 according to one example. FIG. 2 is a diagram illustrating a perspective view of the model controller 100 shown in FIG. 1 according to one example. FIG. 3 is a diagram illustrating a perspective view of the model controller 100 shown in FIG. 1 depicting a trackball 140 in ghost and a number of sensors 150-1, 150-2, 150-3, according to one example. The controller 100 may be used in connection with a computing device and a display device as a hardware interface in order to pan, rotate, and zoom an object such as a 2D or 3D object displayed by a program executed by the computing device on the display device. In one example, the controller 100 may be a peripheral device coupled to the computing device.

The controller 100 may include a number of elements including a body or base unit 110 to support a wheel 130, a trackball 140 with an IMU 145 contained therein, and sensors 150-1, 150-2, 150-3. The sensors 150-1, 150-2, 150-3 may be any sensor that detects movement, and converts real world, analog detected data, into data that the computer may understand using an analog-to-digital (ADC) converter. In one example, at least one of the sensors 150-1, 150-2, 150-3 may include a number mechanical elements or sensors that detect movement of the wheel 130, the trackball 140 or the controller 100 relative to a surface. In another example, at least one of the sensors 150-1, 150-2, 150-3 may be optical sensors that detect movement of the wheel 130, the trackball 140 or the controller 100 relative to a surface using emitted and/or detected electromagnetic radiation. In one specific example, one or both of sensors 150-2 and 150-3 are image sensors that capture images of data tracks formed on the surface of the trackball 140.

The wheel 130 may be any rotatable element that, when rotated, is identifiable as a panning, rotation, or zooming of the displayed object. In one example, the wheel 130 is a dual input device where rotation in a first direction is one input, and rotation in a second direction is another input. In one example, the wheel 130 may be used as an input to cause a selected object displayed on the display device to zoom in and out and cause the selected object to scale larger or smaller, respectively. The wheel 130 may include a number of detector mechanisms that detect the rotation of the wheel 130 about an axis. In the example of FIGS. 1 through 3, the axis of rotation is around the Z-axis as indicated by the coordinate indicator 180. In one example, the wheel 130 is rotatable about a portion of the body 110 of the controller 100.

The trackball 140 may be any sphere that, when rotated in any direction including yaw, pitch, and roll, or combinations thereof is identifiable as a panning, rotation, or zooming of the displayed object. Thus, in one example, the trackball 140 is rotatable in any direction or combination of directions. In one example, the controller 100 continually determines an absolute orientation of the trackball 140 through the use of at least one sensor 150-2, 150-3. In one example, movement of the trackball 140 as detected by the sensors 150-2, 150-3 causes a selected object displayed on the display device to move in a corresponding manner to cause the object to yaw, pitch, and roll.

In one example, the trackball 140 may be held by a socket built into the body 110 of the controller 100. In another example, less than half of the trackball 140 or less than a quarter of the trackball 140 may be covered by a portion of the body 110 to allow a user to touch and interact with a relatively larger portion of the surface of the trackball 140. This allows the user to conveniently manipulate the rotation of the trackball 140 by providing to a user access to more of the surface of the trackball 140. This increased exposure to the surface of the trackball 140 allows a user to take an increased number of positions relative to the controller 100, which, in turn, allows the user to shift hand positions relative to the controller 100. This, in turn, provides more comfort to the user and decreases hand and arm fatigue since the user is not positioning his or her hand in a particular position for long periods of time. Further, exposing a large portion of the trackball 140 with respect to the body 110 of the controller 100 may impart an increased aesthetic quality to the controller 100.

The trackball 140 may be removable from the controller 100. In this example, the trackball 140 is seated on a sensor bed 141. A number of nodules 160 may be formed on the sensor bed 141. The nodules 160 reduce the amount of contact between the trackball 140 and the sensor bed 141. This reduces the amount of friction that may otherwise exist between the trackball 140 and the sensor bed 141.

In the example of FIGS. 1 through 3, the two sensors 150-2, 150-3 may be placed on planes that are approximately perpendicular to one another. In another example, the two sensors 150-2, 150-3 may be placed on planes that are positioned at an acute angle relative to one another. In still another example, the two sensors 150-2, 150-3 may be placed on planes that are positioned at an obtuse angle relative to one another. In yet another example, the two sensors 150-2, 150-3 may be placed on planes that are approximately parallel to one another. In this example, the two sensors 150-2, 150-3 may be positioned on opposite sides of the trackball 140.

A third sensor 150-1 may be embedded in the bottom surface of the controller 100 and exposed to a surface on which the controller is placed. The bottom sensor 150-1 detects movement of the controller 100 along the surface in the x and y directions. In one example, the movement of the controller 100 along the surface as detected by the sensor 150-1 is identifiable as a panning, rotation, or zooming of the displayed object.

The IMU 145 positioned inside of the trackball 140 facilitate determination of the absolute orientation of the trackball 140. The IMU 145 may include at least one of a 3D accelerometer, 3D gyroscope, and a 3D compass, and may sense absolute 3D orientation while the trackball 140 is lifted up off the sensor bed 141. This allows a user to pick up the trackball 140 and control model orientation without being tied to the desktop. In one example, a hybrid IMU and image sensing technique is used for determining orientation of the trackball 40. In one form of this example, the surface of the trackball 140 is covered with a variety of different surface texture tiles. The IMU 145 provides coarse orientation of the trackball 140 to identify the particular surface texture tile currently positioned within the view of the image sensor 150-2 (or 150-3), and then the image sensor 150-2 (or 150-3) is used to determine the precise orientation of the trackball 140 based on a captured image of the identified surface texture tile.

Figure 4:
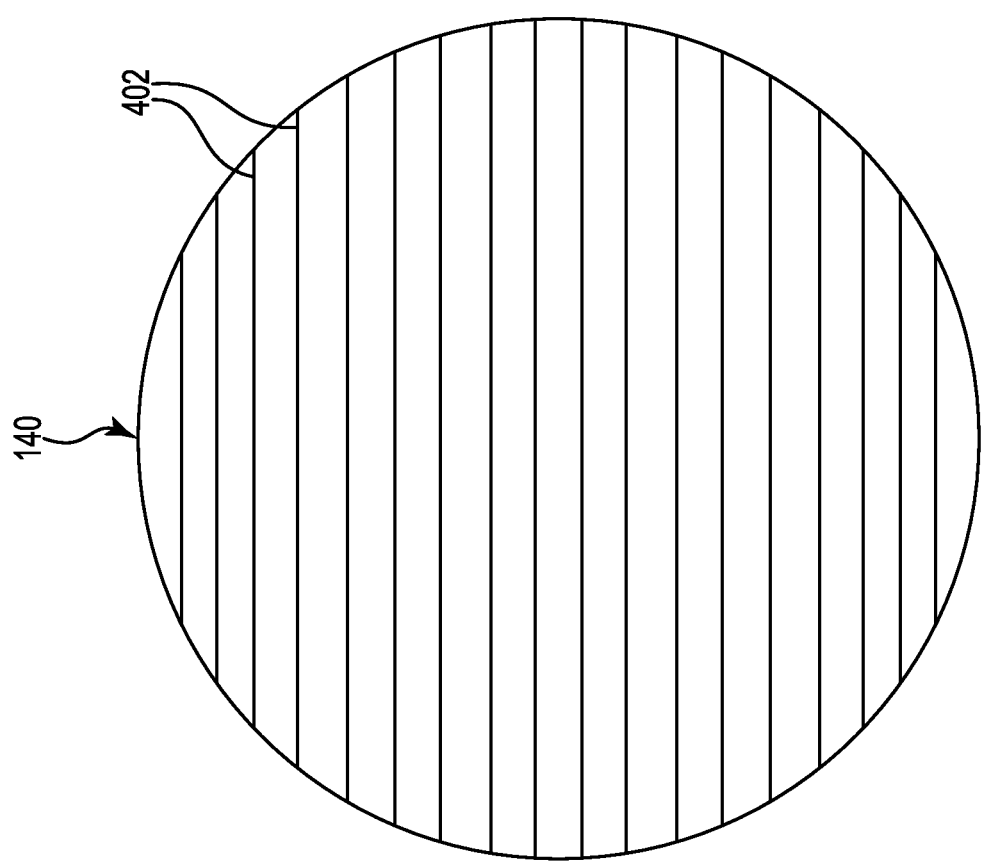
FIG. 4 is a diagram illustrating a trackball with data tracks formed thereon according to one example.

FIG. 4 is a diagram illustrating a trackball 140 with data tracks 402 formed thereon according to one example. In the illustrated example, the data tracks 402 are latitudinal data tracks, with each latitudinal data track being a ring that completely encircles the trackball at a particular latitudinal position. In another example, the data tracks 402 are longitudinal data tracks, with each longitudinal data track being a ring that completely encircles the trackball at a particular longitudinal position. Although the data tracks 402 are shown as being separated from one another in FIG. 4, in some examples, the data tracks 402 completely cover the entire surface of the trackball 140 with little or no separation between adjacent data tracks 402.

Figure 5:
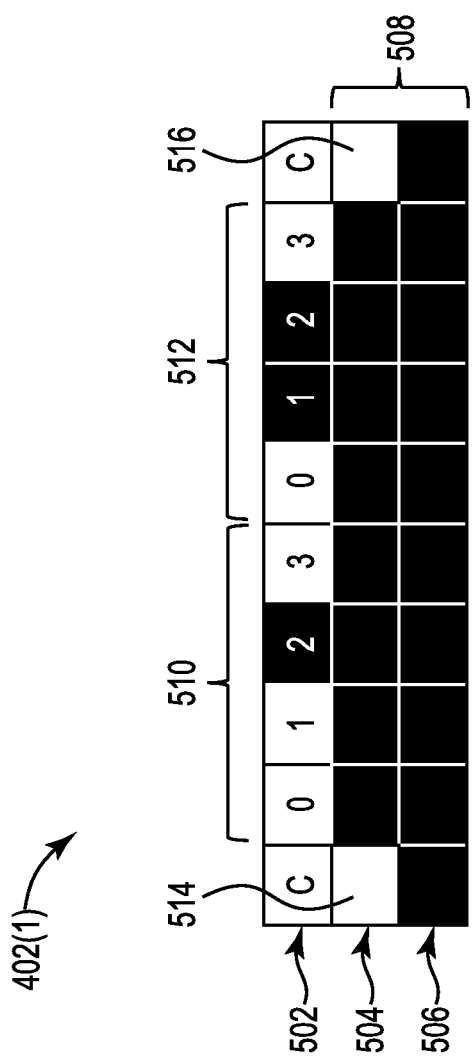
FIG. 5 is a diagram illustrating a portion of an example 3-row data track with one row of data and a 2-row separator according to one example.

FIG. 5 is a diagram illustrating a portion of an example 3-row data track 402(1) with one row of data 502 and a 2-row separator 508 according to one example. The 2-row separator 508 includes rows 504 and 506. The row of data 502 includes two binary clock bits C and two sets of four binary data bits 0-3. The first set of four data bits 0-3 is a meridian ID 510 that defines an elevation angle, and the second set of four data bits 0-3 is a sequential ID 512 that defines an azimuth angle. The separator 508 includes two binary packet start/stop indicator bits 514 and 516, and a plurality of other binary bits. The separator 508 indicates horizon orientation and data boundaries. The combination of the elevation angle, the azimuth angle, and the horizon orientation allows the absolute orientation of the trackball 140 to be determined. In the illustrated example, all of the bits in rows 502-506 are either white or black rectangular pixels, with the bits that are white corresponding to a binary zero, and the bits that are black corresponding to a binary one. As shown in FIG. 5, the white clock bits C in row 502 are vertically aligned with the white packet start/stop indicator bits 514 and 516 in row 504, which helps prevent aliasing between data and separator rows. In other examples, at least one of the rows 502-506 may use a gray scale rather than binary bits.

Figure 6:
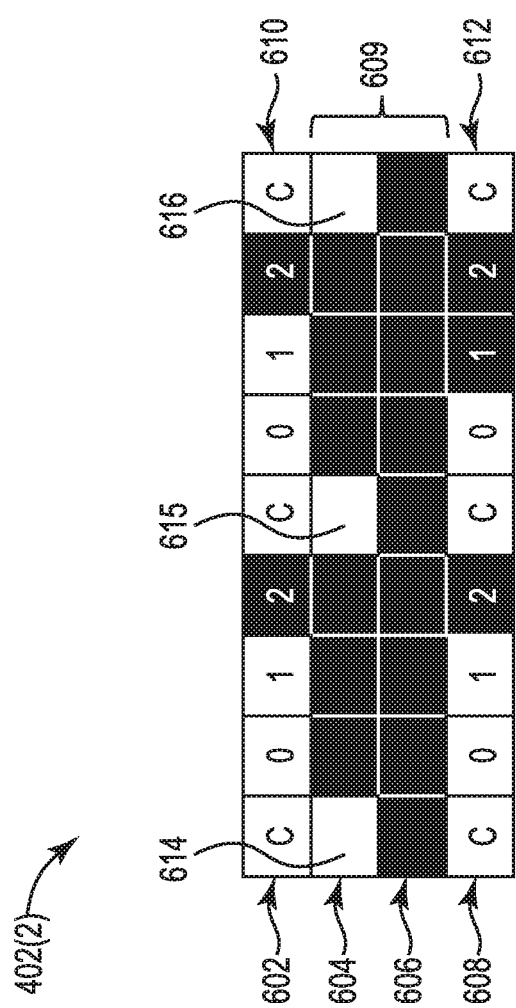
FIG. 6 is a diagram illustrating a portion of an example 4-row data track with two rows of data separated by a 2-row separator according to one example.

FIG. 6 is a diagram illustrating a portion of an example 4-row data track 402(2) with two rows of data 602 and 608 separated by a 2-row separator 609 according to one example. The 2-row separator 609 includes rows 604 and 606. Each of the two rows of data 602 and 608 includes three binary clock bits C and two sets of three binary data bits 0-2. Row of data 602 incudes two 3-bit meridian IDs 610 that define two elevation angles, and row of data 608 includes two 3-bit sequential is 612 that define two azimuth angles. The separator 609 includes three binary packet start/stop indicator bits 614-616, and a plurality of other binary bits. The separator 609 indicates horizon orientation and data boundaries. The combination of the elevation angle, the azimuth angle, and the horizon orientation allows the absolute orientation of the trackball 140 to be determined. In the illustrated example, all of the bits in rows 602-08 are either white or black rectangular pixels, with the bits that are white corresponding to a binary zero, and the bits that are black corresponding to a binary one. As shown in FIG. 6, the white clock bits C in rows 602 and 608 are vertically aligned with the white packet start/stop indicator bits 614 and 616 in row 604, which helps prevent aliasing between data and separator rows. In other examples, at least one of the rows 602-608 may use a gray scale rather than binary bits.

Figure 7:
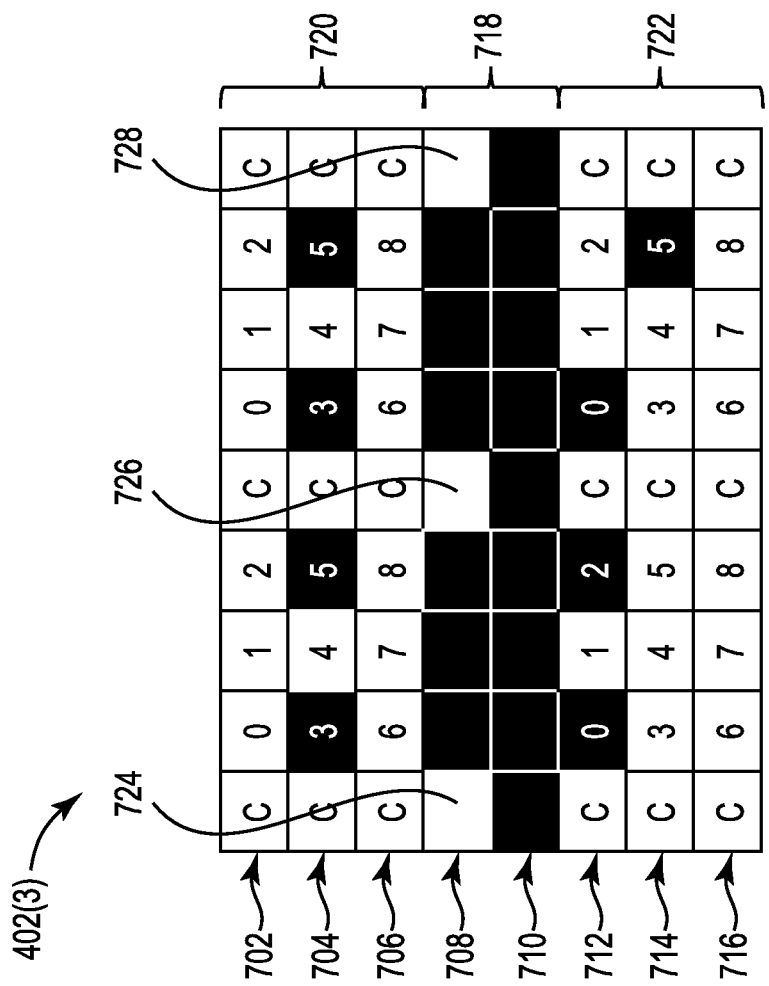
FIG. 7 is a diagram illustrating a portion of an example 8-row data track with a first set of three rows of data separated from a second set of three rows of data by a 2-row separator according to one example.

FIG. 7 is a diagram illustrating a portion of an example 8-row data track 402(3) with a first set of three rows of data 702-706 separated from a second set of three rows of data 712-716 by a 2-row separator 718 according to one example. The 2-row separator 718 includes rows 708 and 710. Each of the first set of three rows of data 702-706 and the second set of three rows of data 712-716 includes nine binary clock bits C and two sets of nine binary data bits 0-8 (a total of four 3×3 data arrays). The first set of three rows of data 702-706 includes two 9-bit meridian ID 720 that define two elevation angles, and the second set of three rows of data 712-716 includes two 9-bit sequential ID 722 that define two azimuth angles. The separator 718 includes three binary packet start/stop indicator bits 724-728, and a plurality of other binary bits. The separator 718 indicates horizon orientation and data boundaries. The combination of the elevation angle, the azimuth angle, and the horizon orientation allows the absolute orientation of the trackball 140 to be determined. In the illustrated example, all of the bits in rows 702-716 are either white or black rectangular pixels, with the bits that are white corresponding to a binary zero, and the bits that are black corresponding to a binary one. As shown in FIG. 7, the white clock bits C in rows 702-706 and 712-718 are vertically aligned with the white packet start/stop indicator bits 724-728 in row 708, which helps prevent aliasing between data and separator rows. In other examples, at least one of the rows 702-716 may use a gray scale rather than binary bits. Although 3×3 data arrays are shown in FIG. 7, in other examples, data arrays of other sizes may be used (e.g., N×N data arrays, where N is an integer greater than 1).

Figure 8:
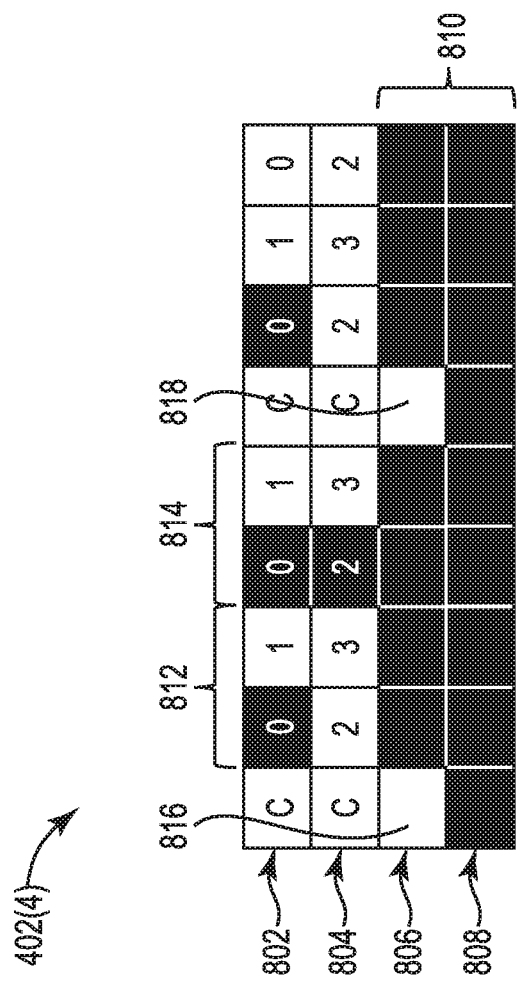
FIG. 8 is a diagram illustrating a portion of an example 4-row data track with two rows of data and a 2-row separator below the two rows of data according to one example.

FIG. 8 is a diagram illustrating a portion of an example 4-row data track 402(4) with two rows of data 802 and 804, and a 2-row separator 810 below the two rows of data, according to one example. The 2-row separator 810 includes rows 806 and 808. Rows of data 802 and 804 include four binary clock bits C and three complete sets (and one partial set) of four binary data bits 0-3 (a total of three complete 2×2 data arrays). Rows of data 802 and 804 include a 4-bit meridian ID 812 that defines an elevation angle, and a 4-bit sequential ID 814 that define an azimuth angle. The separator 810 includes two binary packet start/stop indicator bits 816 and 818, and a plurality of other binary bits. The separator 810 indicates horizon orientation and data boundaries. The combination of the elevation angle, the azimuth angle, and the horizon orientation allows the absolute orientation of the trackball 140 to be determined. In the illustrated example, all of the bits in rows 802-808 are either white or black rectangular pixels, with the bits that are white corresponding to a binary zero, and the bits that are black corresponding to a binary one. As shown in FIG. 8, the white clock bits C in rows 802 and 804 are vertically aligned with the white packet start/stop indicator bits 816 and 818 in row 808, which helps prevent aliasing between data and separator rows. In other examples, at least one of the rows 802-808 may use a gray scale rather than binary bits. Although 2×2 data arrays are shown in FIG. 8, in other examples, data arrays of other sizes may be used (e.g., N×N data arrays, where N is an integer greater than 1).

Figure 9:
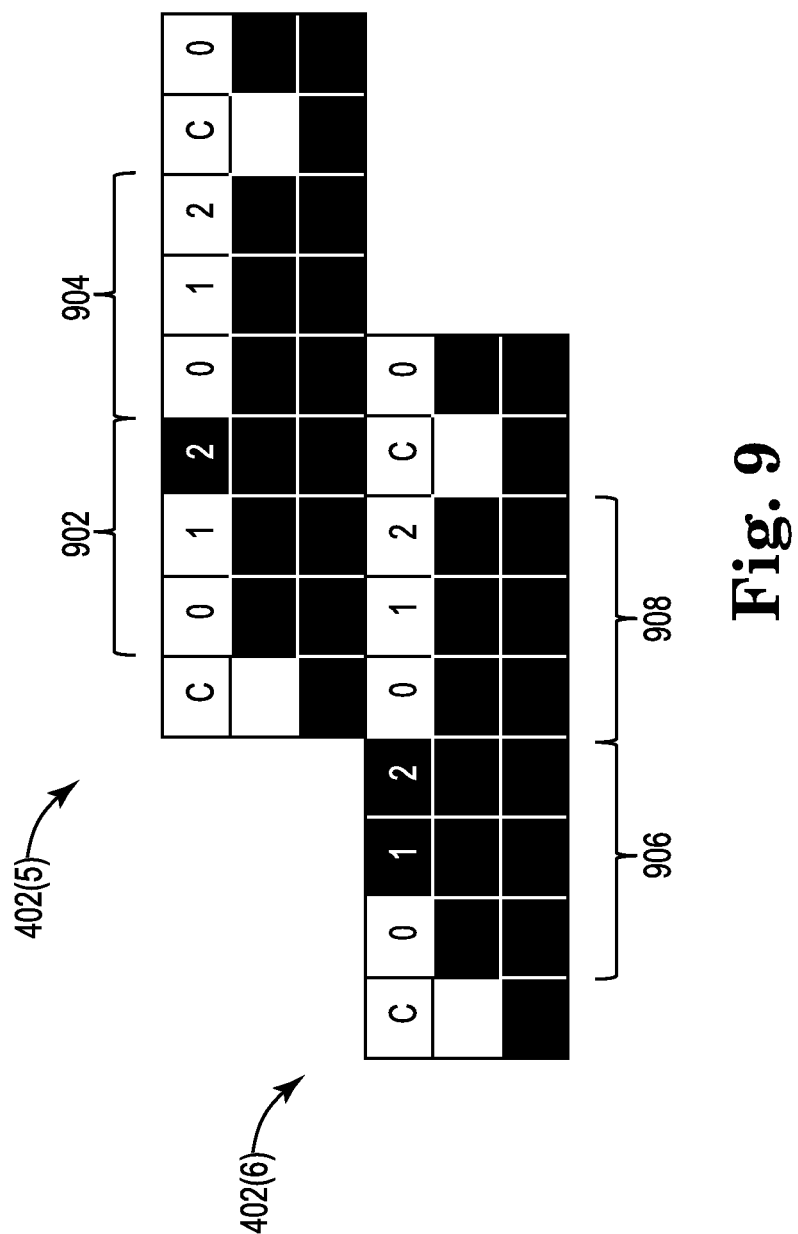
FIG. 9 is a diagram illustrating a phase offset between two data tracks according to one example.

FIG. 9 is a diagram illustrating a phase offset between two data tracks 402(5) and 402(6) according to one example. Data tracks 402(5) and 402(6) are implemented in the same manner as data track 402(1) (FIG. 5), with the exception that the meridian IDs and sequential is are both shown as 3-bit values rather than the 4-bit values shown in FIG. 5. In the illustrated example, data track 402(5) is a latitudinal data track with a 3-bit meridian ID 902 that defines an elevation angle, and a 3-bit sequential ID 904 that defines an azimuth angle. Data track 402(6) is a latitudinal data track that is directly adjacent to data track 402(5), and includes a 3-bit meridian ID 906 that defines an elevation angle, and a 3-bit sequential ID 908 that defines an azimuth angle. Data tracks 402(5) and 402(6) are horizontally offset from one another (phase offset) such that the meridian ID 902 of the top data track 402(5) is substantially vertically aligned with and vertically proximate to the sequential ID 908 of the bottom data track 402(6). Since the complete versions of the two data tracks 402(5) and 402(6) may have a slightly different overall length, the shape of the rectangular bits or pixels of the data tracks can instead be made to be non-rectangular (e.g., trapezoidal) to facilitate better latitude-to-latitude alignment. The phase offset shown in FIG. 9 may also be applied to the data tracks shown in FIGS. 6-8.

Figure 10:
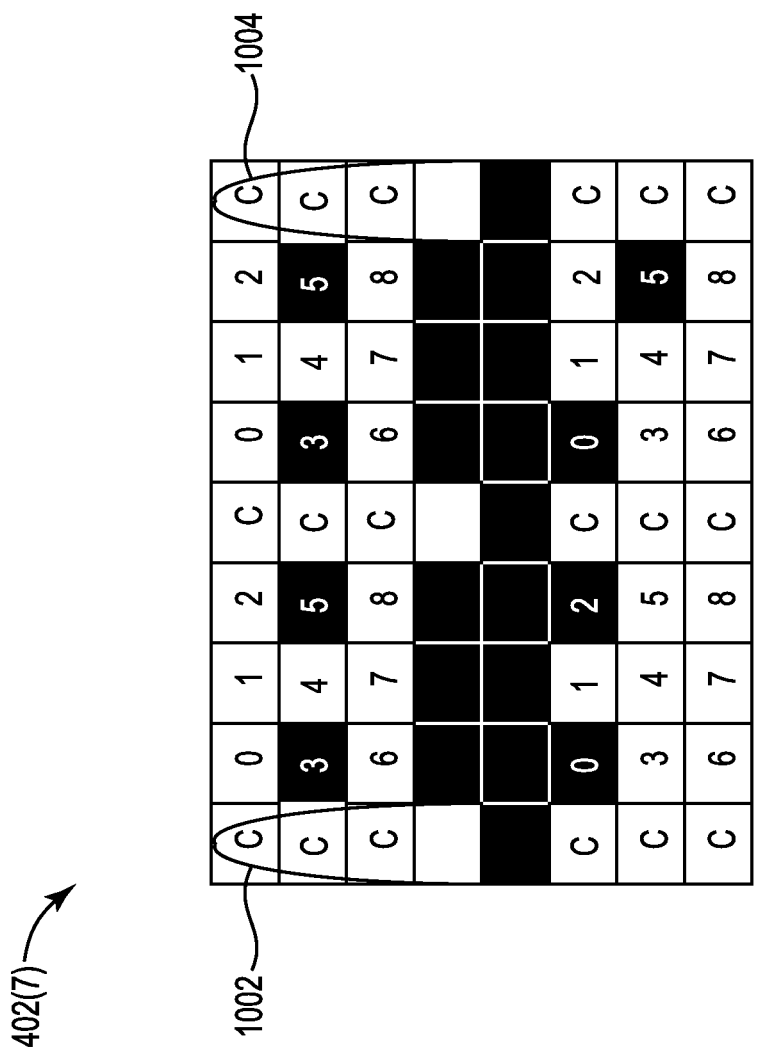
FIG. 10 is a diagram illustrating a spherical adjustment in clock columns of data tracks according to one example.

FIG. 10 is a diagram illustrating a spherical adjustment in dock columns of a data track 402(7) according to one example. Data track 402(7) is implemented in the same manner as data track 402(3) (FIG. 7). As mentioned above, two adjacent data tracks may have a slightly different overall length. Similarly, rows within a given data track may have a slightly different overall length. In some examples, the size and shape of the clock bits C may be modified to compensate for these varying lengths, as shown at 1002 and 1004.

Figure 11:
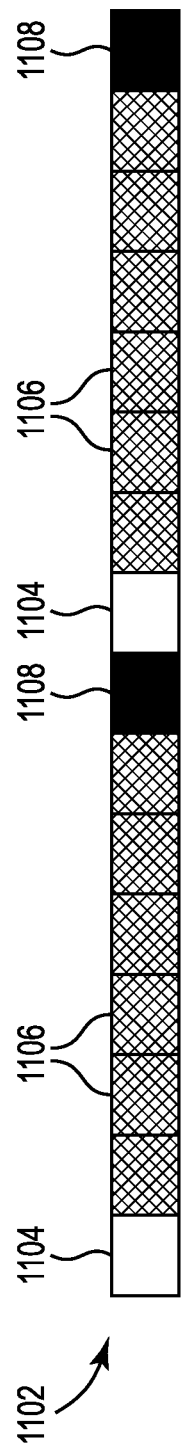
FIG. 11 is a diagram illustrating a 1-row gray scale separator for a data track according to one example.

FIG. 11 is a diagram illustrating a 1-row gray scale separator 1102 for a data track according to one example. In the examples shown in FIGS. 5-10, a 2-row binary separator is used in the data tracks. In other examples, a gray scale separator may be used in place of the binary separator. Gray scale separator 1102 includes two white packet start/stop indicator bits 1104, twelve gray bits 1106, and two black bits 1108. A minimum of 3 colors (gray levels) is sufficient to define gradient orientation and distinguish true north. Other examples may use more than 3 colors.

Figure 12:
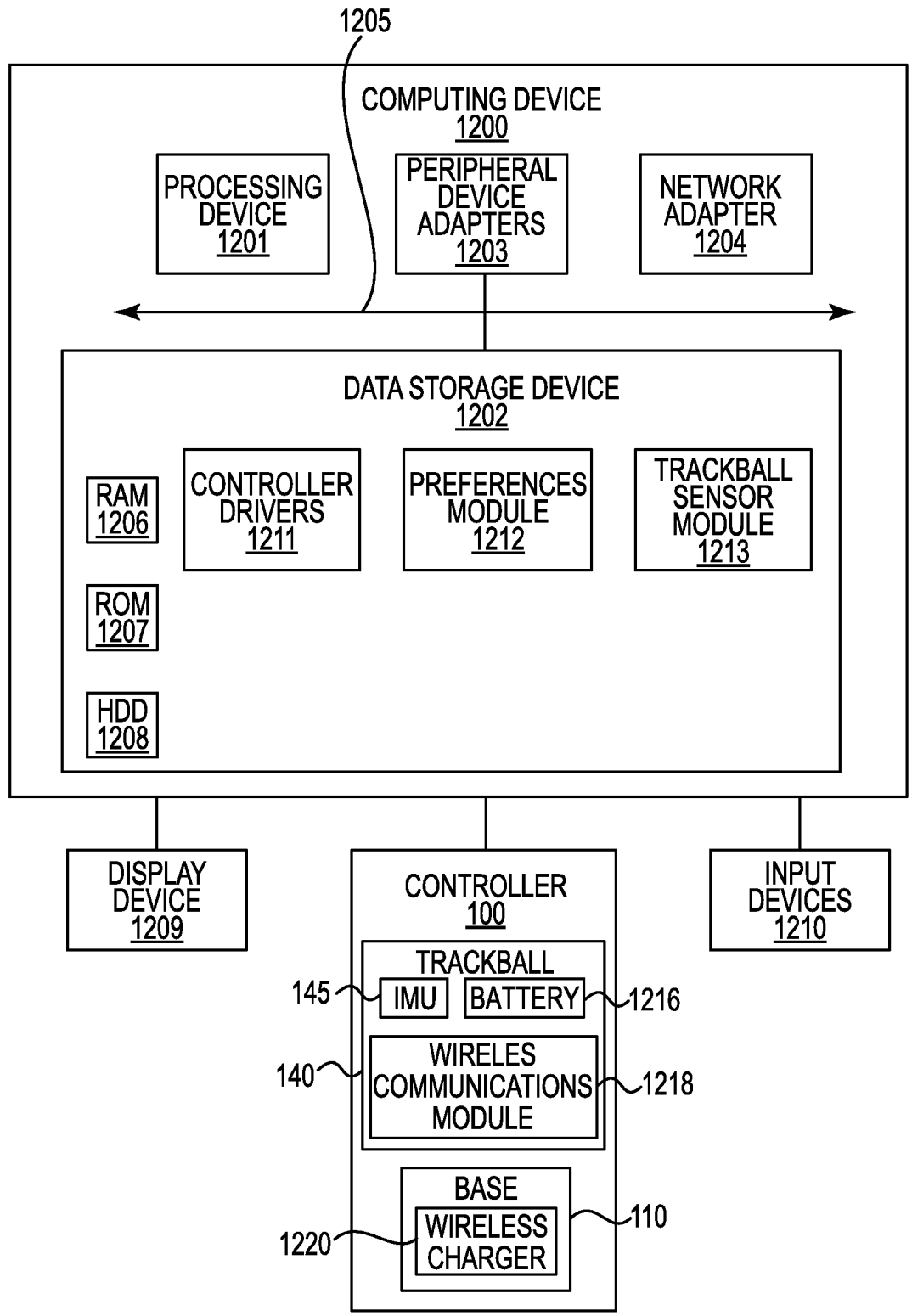
FIG. 12 is a block diagram of a computing system utilizing a model controller according to one example.

FIG. 12 is a block diagram of a computing device 1200 utilizing a model controller 100 according to one example. The computing device 1200 may be implemented in an electronic device. Examples of electronic devices include servers, desktop computers, laptop computers, personal digital assistants (PDAs), mobile devices, smartphones, gaming systems, and tablets, among other electronic devices.

To achieve its desired functionality, the computing device 1200 comprises various hardware components. Among these hardware components may be a number of processing devices or processors 1201, a number of data storage devices 1202, a number of peripheral device adapters 1203, and a number of network adapters 1204. These hardware components may be interconnected through the use of a number of busses and/or network connections. In one example, the processor 1201, data storage device 1202, peripheral device adapters 1203, and a network adapter 1204 may be communicatively coupled via a bus 1205.

The processor 1201 may include a hardware architecture to retrieve executable code from the data storage device 1202 and execute the executable code. The executable code may, when executed by the processor 1201, cause the processor 1201 to implement at least the functionality of identifying input from controller 100 and interpreting that input to cause a selected object displayed on a display device 1209 to pan, rotate, zoom, be controlled, or combinations thereof, according to the methods of the present specification described herein. In the course of executing code, the processor 1201 may receive input from and provide output to a number of the remaining hardware units.

The data storage device 1202 may store data such as executable program code that is executed by the processor 1201 or other processing device. As will be discussed, the data storage device 1202 may specifically store computer code representing a number of applications that the processor 1201 executes to implement at least the functionality described herein.

The data storage device 1202 may include various types of memory modules, including volatile and nonvolatile memory. For example, the data storage device 1202 of the present example includes Random Access Memory (RAM) 1206, Read Only Memory (ROM) 1207, and Hard Disk Drive (HDD) memory 1208. Many other types of memory may also be utilized, and the present specification contemplates the use of many varying type(s) of memory in the data storage device 1202 as may suit a particular application of the principles described herein. In certain examples, different types of memory in the data storage device 1202 may be used for different data storage needs. For example, in certain examples the processor 1201 may boot from Read Only Memory (ROM) 1207, maintain nonvolatile storage in the Hard Disk Drive (HDD) memory 1208, and execute program code stored in Random Access Memory (RAM) 1206.

Generally, the data storage device 1202 may comprise a computer readable medium, a computer readable storage medium, or a non-transitory computer readable medium, among others. For example, the data storage device 1202 may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The adapters 1203, 1204 in the computing device 1200 enable the processor 1201 to interface with various other hardware elements, external and internal to the computing device 1200. For example, the peripheral device adapters 1203 may provide an interface to input/output devices, such as, for example, display device 1209, controller 100, and other input devices 1210 such as a mouse, or a keyboard. The peripheral device adapters 1203 may also provide access to other external devices such as an external storage device, a number of network devices such as, for example, servers, switches, and routers, client devices, other types of computing devices, and combinations thereof.

The display device 1209 may be provided to allow a user of the computing device 1200 to interact with and implement the functionality of the computing device 1200. Examples of display devices may include a virtual reality headset, a monitor, a light-emitting diode (LED) display, a cathode ray tube display, a television, a projected image, or other display devices.

The peripheral device adapters 1203 may create an interface between the processor 1201 and the display device 1209, a printer, or other media output devices. The network adapter 1204 may provide an interface to other computing devices within, for example, a network, thereby enabling the transmission of data between the computing device 1200 and other devices located within the network.

The computing device 1200 further comprises a number of modules used in the implementation of identifying input from controller 100 and interpreting that input to cause a selected object displayed on display device 1209 to pan, rotate, zoom, be controlled, or combinations thereof. The various modules within the computing device 1200 comprise executable program code that may be executed separately. In this example, the various modules may be stored as separate computer program products. In another example, the various modules within the computing device 1200 may be combined within a number of computer program products; each computer program product comprising a number of the modules.

The computing device 1200 may include a number of controller drivers 1211 to control the controller 100. The controller drivers 1211 may be any software that provides an interface to the computing device 1200, and enables operating systems and other computer programs executed on the computing device 1200 to access hardware functions without needing to know precise details of the hardware being used. The controller drivers 1211 may communicate with the controller 100 through the bus 1205 or communications subsystem to which the controller 100 connects. When a program executed by the computing device 1200 such as, for example, a computer-aided design (CAD) program, calls or invokes a routine in the controller drivers 1211, the controller drivers 1211 issue commands to the controller 100. Once the controller 100 sends data back to the controller drivers 1211, the controller drivers 1211 may invoke routines in the original calling program.

The computing device 1200 may also include a preferences module 1212 to, when executed by the processor 1201, accept user input regarding what action is taken when the wheel 130 is rotated, when the trackball 140 is rotated, when the controller 100 is moved along the surface, when the buttons 404-1, 404-2 are selected, or combinations thereof. In one example, a default preference may be set regarding the actuation of each of the elements of the controller 100. Further, a user may define the preferences regarding the actuation of each of the elements of the controller 100.

The computing device 1200 may also include a trackball sensor module 1213 to, when executed by the processor 1201, analyze images of the data tracks 402 captured by image sensors 150-2, 150-3; identify meridian IDs, sequential IDs, and horizon orientation information contained in the captured images; and determine a current absolute orientation of the trackball 140 based on the identified information in the captured images.

In the illustrated example, the trackball 140 of the controller 100 includes IMU 145, battery 1216, and wireless communications module 1218. The base unit 110 includes a wireless charger 1220. The battery 1216 powers the IMU 145 and the wireless communications module 1218. The battery 1216 is wirelessly charged by the wireless charger 1220 in the base unit 110. This example allows the trackball 140 to be removed from the base unit 110 and still provide orientation information via the IMU 145 and the wireless communications module 1218.

Figure 13:
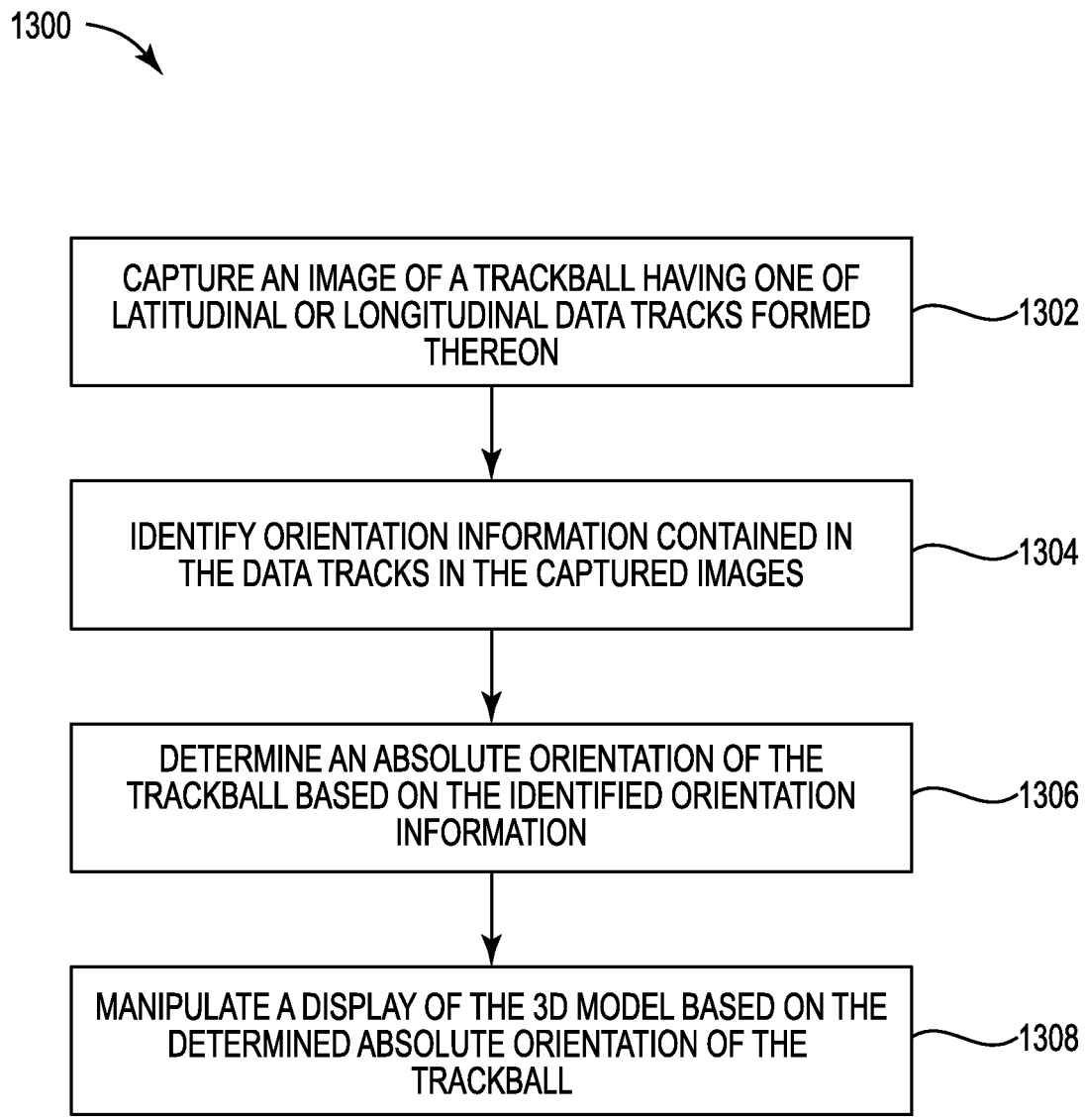
FIG. 13 is a flow diagram illustrating a method for manipulating a 3D model.

One example is directed to a method for manipulating a three-dimensional (3D) model. FIG. 13 is a flow diagram illustrating a method 1300 for manipulating a 3D model. At 1302 in method 1300, an image of a trackball having one of latitudinal or longitudinal data tracks formed thereon is captured. At 1304, orientation information contained in the data tracks in the captured images is identified. At 1306, an absolute orientation of the trackball is determined based on the identified orientation information. At 1308, a display of the 3D model is manipulated based on the determined absolute orientation of the trackball.

In one example of method 1300, the orientation information includes an elevation value and an azimuth value. The elevation value and the azimuth value in method 1300 may be provided by at least one row of binary bits in the data tracks.

Another example is directed to a model controller that includes a trackball having a spherical surface with one of latitudinal or longitudinal data tracks formed thereon. The model controller includes a base unit including a first image sensor adjacent to the trackball to capture images of the data tracks, wherein the captured images of the data tracks include orientation information to determine an absolute orientation of the trackball.

The orientation information may include an elevation value and an azimuth value. Each of the data tracks may include at least one row of data and at least one separator row to provide separation between rows of data. The at least one separator row may indicate a horizon orientation and identify data boundaries. The at least one row of data may include a plurality of binary bits. The plurality of binary bits may be represented by white and black rectangles. The plurality of binary bits may include a plurality of clock bits that are one of all white rectangles or al black rectangles. The plurality of binary bits may define at least one elevation value and at least one azimuth value. The at least one row of data may include a plurality of rows of data, with each row of data including a plurality of binary bits, and wherein data in the rows of data are organized in N×N arrays, where N is an integer greater than 1.

Yet another example is directed to a model controller that includes a trackball having a spherical surface, and an inertial measurement unit contained within the trackball to facilitate a determination of an orientation of the trackball. The model controller further includes a base unit including a first image sensor adjacent to the trackball to facilitate the determination of the orientation of the trackball.

The inertial measurement unit may provide coarse orientation information that is used in combination with an image of the trackball captured by the first image sensor to determine a precise orientation of the trackball. The trackball may include a battery to power the inertial measurement unit, and the base unit may include a wireless charger to wirelessly charge the battery.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A model controller, comprising:
 a trackball having a spherical surface with one of latitudinal or longitudinal data tracks formed thereon; and
 a base unit including a first image sensor adjacent to the trackball to capture images of the data tracks, wherein the captured images of the data tracks include orientation information to determine an absolute orientation of the trackball.

2. The model controller of claim 1, wherein the orientation information includes an elevation value and an azimuth value.

3. The model controller of claim 1, wherein each of the data tracks includes at least one row of data and at least one separator row to provide separation between rows of data.

4. The model controller of claim 3, wherein the at least one separator row indicates a horizon orientation and identifies data boundaries.

5. The model controller of claim 3, wherein the at least one row of data includes a plurality of binary bits.

6. The model controller of claim 5, wherein the plurality of binary bits are represented by white and black rectangles.

7. The model controller of claim 6, wherein the plurality of binary bits includes a plurality of clock bits that are one of all white rectangles or all black rectangles.

8. The model controller of claim 5, wherein the plurality of binary bits define at least one elevation value and at least one azimuth value.

9. The model controller of claim 5, wherein the at least one row of data includes a plurality of rows of data, with each row of data including a plurality of binary bits, and wherein data in the rows of data are organized in N×N arrays, where N is an integer greater than 1.

10. A method for manipulating a three-dimensional (3D) model, the method comprising:
    capturing an image of a trackball having one of latitudinal or longitudinal data tracks formed thereon;
    identifying orientation information contained in the data tracks in the captured image;
    determining an absolute orientation of the trackball based on the identified orientation information; and
    manipulating a display of the 3D model based on the determined absolute orientation of the trackball.

11. The method of claim 10, wherein the orientation information includes an elevation value and an azimuth value.

12. The method of claim 11, wherein the elevation value and the azimuth value are provided by at least one row of binary bits in the data tracks.

13. A model controller, comprising:
    a trackball having a spherical surface;
    an inertial measurement unit contained within the trackball to facilitate a determination of an orientation of the trackball; and
    a base unit including a first image sensor adjacent to the trackball to facilitate the determination of the orientation of the trackball.

14. The model controller of claim 13, wherein the inertial measurement unit provides coarse orientation information that is used in combination with an image of the trackball captured by the first image sensor to determine a precise orientation of the trackball.

15. The model controller of claim 13, wherein the trackball includes a battery to power the inertial measurement unit, and wherein the base unit includes a wireless charger to wirelessly charge the battery.

* * * * *